United States Patent
Lin et al.

(10) Patent No.: US 10,148,402 B2
(45) Date of Patent: Dec. 4, 2018

(54) METHOD AND APPARATUS FOR BEAM MANAGEMENT IN A WIRELESS COMMUNICATION SYSTEM

(71) Applicant: ASUSTek Computer Inc., Taipei (TW)

(72) Inventors: Ko-Chiang Lin, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 15/863,267

(22) Filed: Jan. 5, 2018

(65) Prior Publication Data

US 2018/0198583 A1 Jul. 12, 2018

Related U.S. Application Data

(60) Provisional application No. 62/443,291, filed on Jan. 6, 2017.

(51) Int. Cl.
*H04L 5/00* (2006.01)
*H04W 72/04* (2009.01)
(Continued)

(52) U.S. Cl.
CPC ......... *H04L 5/0048* (2013.01); *H04B 7/0617* (2013.01); *H04B 7/0695* (2013.01);
(Continued)

(58) Field of Classification Search
CPC ............ H04L 5/0048; H04W 72/0406; H04W 72/085; H04W 88/08; H04W 88/02; H04B 7/0617
See application file for complete search history.

(56) References Cited

U.S. PATENT DOCUMENTS

2017/0195998 A1 7/2017 Zhang
2017/0288763 A1* 10/2017 Yoo .................... H01Q 3/10
(Continued)

FOREIGN PATENT DOCUMENTS

| WO | 2015080648 | 6/2015 |
|----|------------|--------|
| WO | 2017020688 | 2/2017 |
| WO | 2017067138 | 4/2017 |

OTHER PUBLICATIONS

Samsung: "Discussion on DL beam management procedures P-2 and P-3", 3GPP Draft; R1-1612509, 3rd Generation Partnership Project (3GPP), Mobile Competence Centre ; 650, Route Des Lucioles ; F-06921 Sophia-Antipolis Cedex ;France vol. Ran WG1, No. Reno, USA; Nov. 14, 2016-Nov. 18, 2016 Nov. 13, 2016 (Nov. 13, 2016), XP051176456, Retrieved from the Internet: URL:http://www.3gpp.org/ftp/Meetings_3GPP_SYNC/RAN1/Docs/.
(Continued)

*Primary Examiner* — Min Jung
(74) *Attorney, Agent, or Firm* — Blue Captial Law Firm, P.C.

(57) ABSTRACT

A method and apparatus are disclosed from the perspective of a base station. In one embodiment, the method includes the base station transmitting to a UE a control signal associated with a reference signal for beam measurement, wherein the control signal includes a beam-related information for transmitting the reference signal for beam measurement. The method also includes the base station transmitting the reference signal for beam measurement to the UE.

15 Claims, 12 Drawing Sheets

(51) Int. Cl.
*H04B 7/06* (2006.01)
*H04W 72/08* (2009.01)
*H04W 88/08* (2009.01)
*H04W 88/02* (2009.01)

(52) U.S. Cl.
CPC ..... *H04W 72/0406* (2013.01); *H04W 72/085* (2013.01); *H04L 5/00* (2013.01); *H04W 88/02* (2013.01); *H04W 88/08* (2013.01)

(56) References Cited

U.S. PATENT DOCUMENTS

2017/0289917 A1* 10/2017 Visotsky ............. H04W 52/143
2018/0034531 A1* 2/2018 Sadiq .................. H04B 7/0408
2018/0048375 A1* 2/2018 Guo .................... H04B 7/0695
2018/0049177 A1* 2/2018 Islam .................. H04W 72/046
2018/0103407 A1* 4/2018 Nagaraja ............. H04W 36/30

OTHER PUBLICATIONS

Intel Corporation: Reference Signal and Procedure for the UE Beam Refinement (BMP-3)11, 3GPP draft: R1-1609514 Reference Signal and Procedure for UE Beam Refinement R1, 3rd Generation Partnership Project (3GPP), Mobile Competence Centre ; 650, Route Des Lucioles ; F-06921 Sophia-Antopoli,vol. RAN WG1, No. Lisbon, Portugal; Oct. 10, 2016-Oct. 14, 2016 Oct. 9, 2016 (Oct. 9, 2016), XP051149553, Retrieved from the Internet.
European Search Report from corresponding EP Application No. 18150416.8, dated May 22, 2018.

* cited by examiner (a) Digital beamforming (b) Analogue beamforming (c) Hybrid beamforming: Left = fully connected, Right = sub-array

METHOD AND APPARATUS FOR BEAM MANAGEMENT IN A WIRELESS COMMUNICATION SYSTEM

CROSS-REFERENCE TO RELATED APPLICATIONS

The present Application claims the benefit of U.S. Provisional Patent Application Ser. No. 62/443,291 filed on Jan. 6, 2017, the entire disclosure of which is incorporated herein in its entirety by reference.

FIELD

This disclosure generally relates to wireless communication networks, and more particularly, to a method and apparatus for beam management in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a base station. In one embodiment, the method includes the base station transmitting to a UE a control signal associated with a reference signal for beam measurement, wherein the control signal includes a beam-related information for transmitting the reference signal for beam measurement. The method also includes the base station transmitting the reference signal for beam measurement to the UE.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia and Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; TS 36.213 v13.2.0, "E-UTRA; Physical layer procedures (Release 14)"; TS 36.101 v14.1.0, "E-UTRA User Equipment (UE) radio transmission and reception (Release 14)"; and TS 36.321 v14.0.0, "Medium Access Control (MAC) protocol specification (Release 14)". The standards and documents listed above are hereby expressly incorporated by reference in their entirety.

Figure 1:
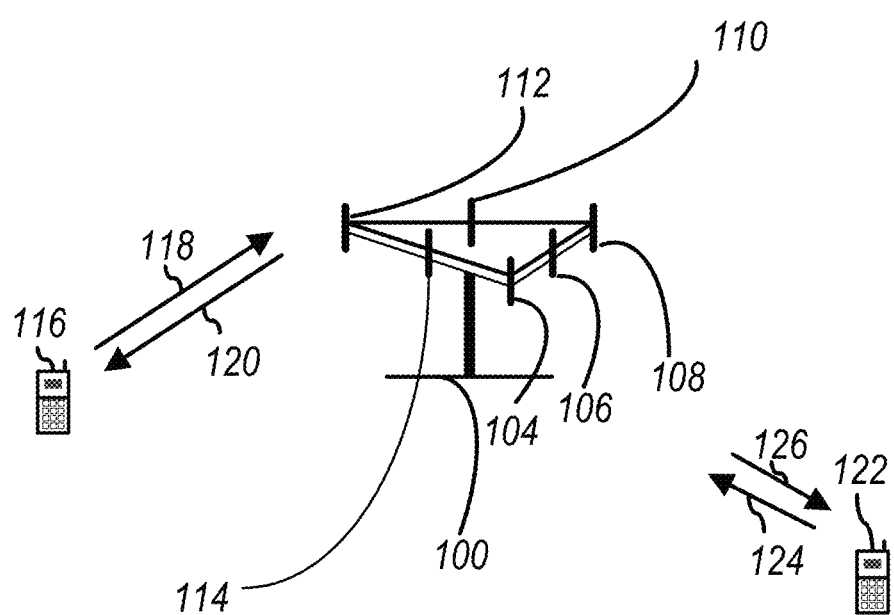
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
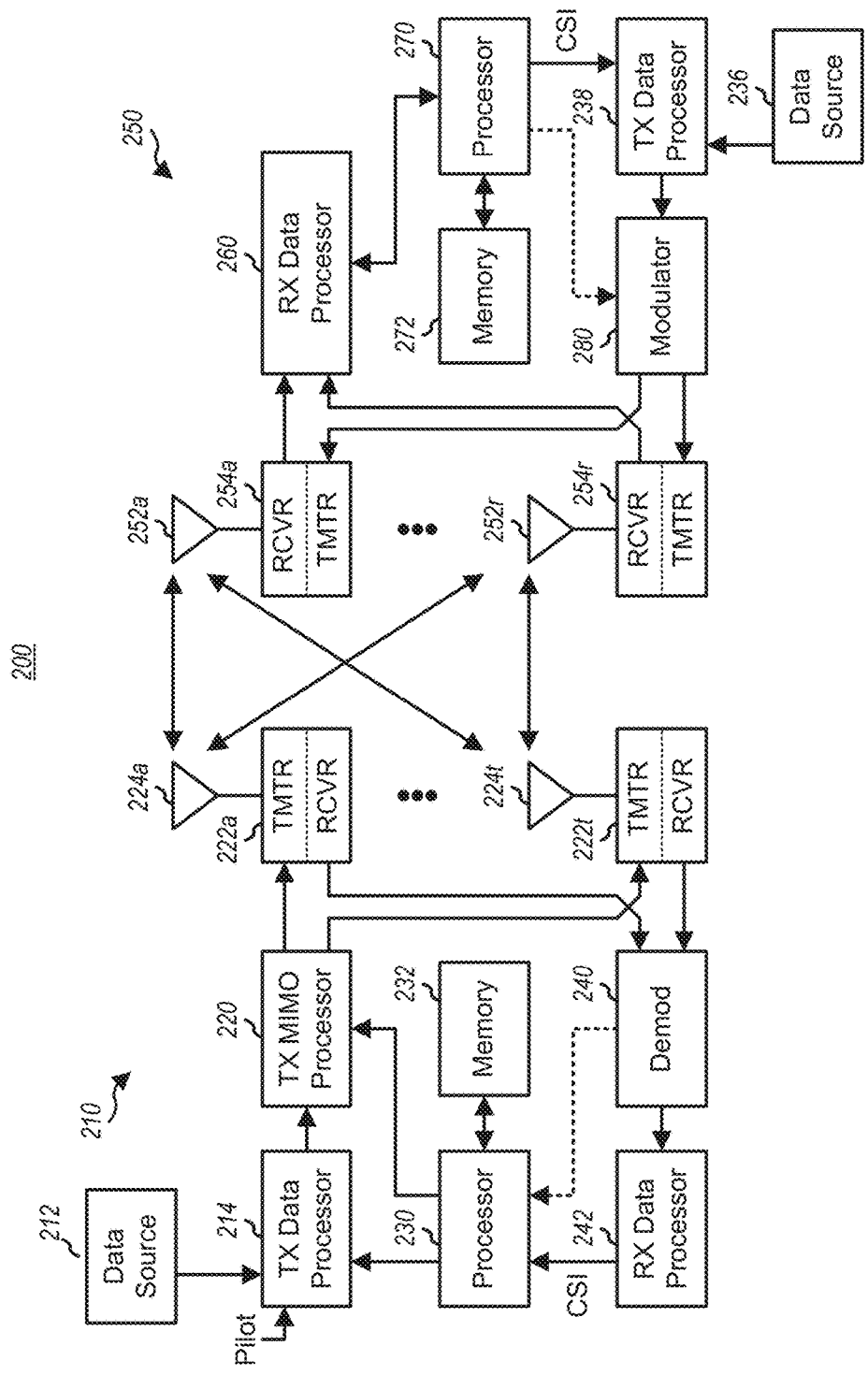
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
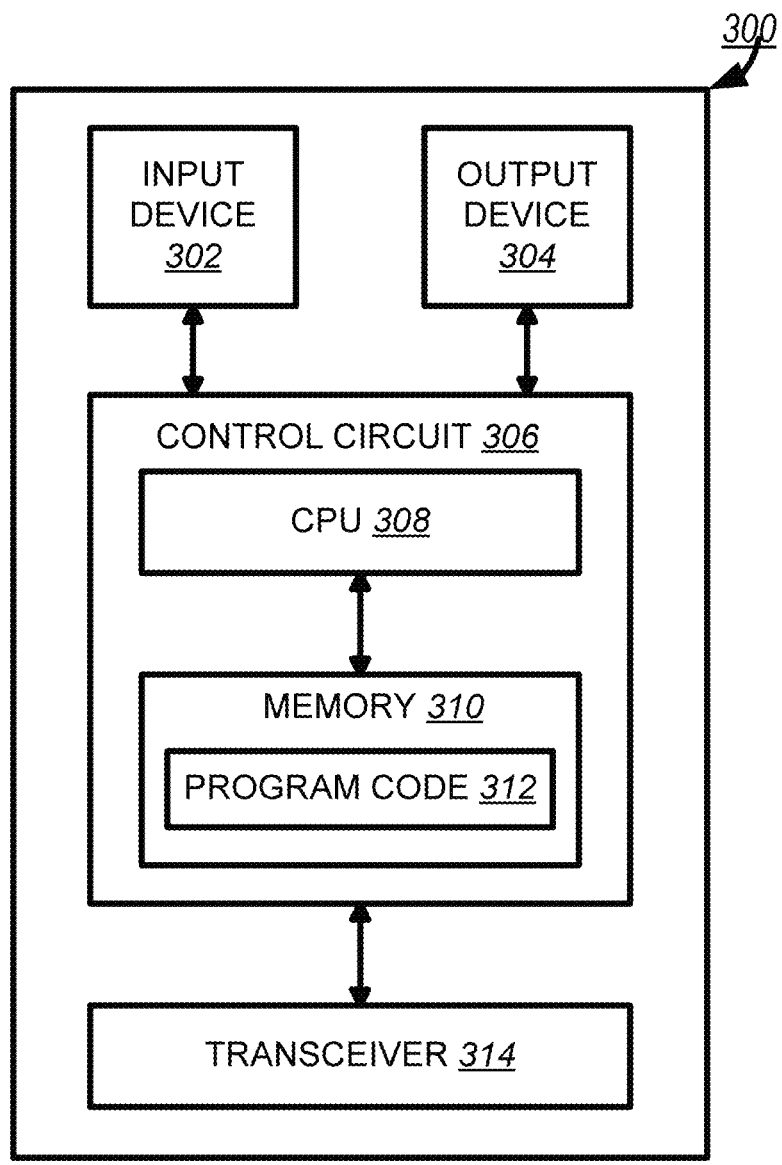
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
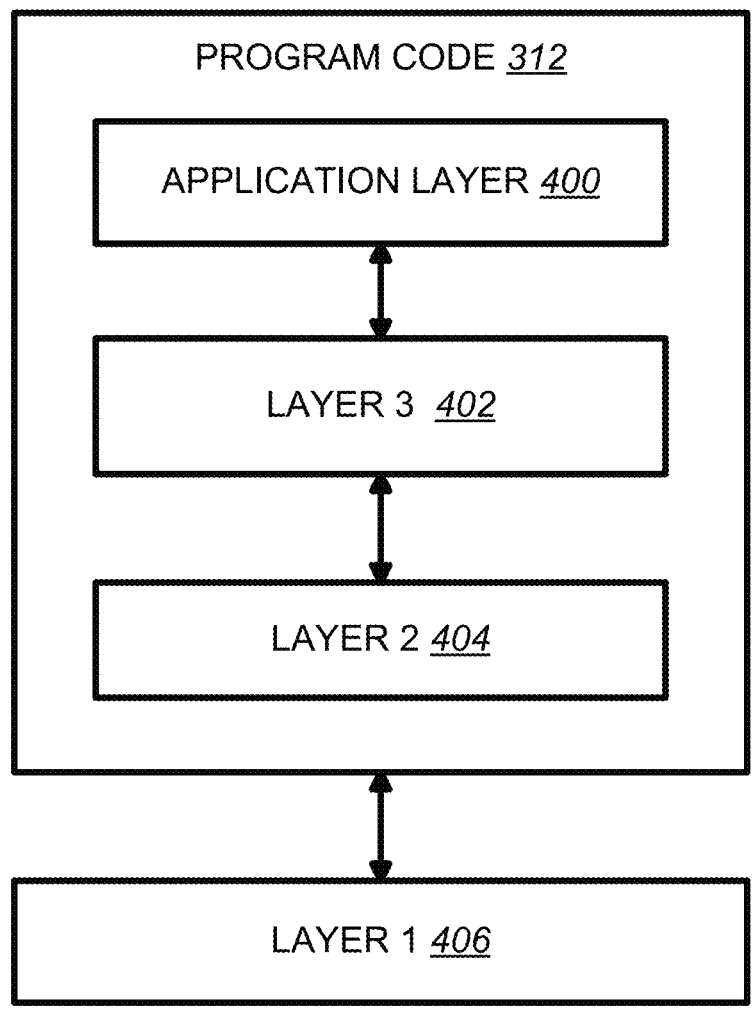
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

As described in 3GPP R2-162366, in lower frequency bands (e.g., current LTE bands<6 GHz), the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence, the high gain beams are narrow compared to a wide sector beam. Therefore, multiple beams for transmitting downlink common channels are needed to cover the required cell area. The number of concurrent high gain beams that access point is able to form may be limited by the cost and complexity of the utilized transceiver architecture. In practice, on higher frequencies, the number of concurrent high gain beams is much less than the total number of beams required to cover the cell area. In other words, the access point is able to cover only part of the cell area by using a subset of beams at any given time.

As described in 3GPP R2-163716, beamforming is generally a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Beamforming can be categorized into three types of implementation: digital beamforming, hybrid beamforming, and analog beamforming. For digital beamforming, the beam is generated on the digital domain, i.e., the weighting of each antenna element can be controlled by baseband (e.g., connected to a TXRU). Therefore it is very easy to tune the beam direction of each subband differently across the system bandwidth. Also, to change beam direction from time to time does not require any switching time between OFDM (Orthogonal Frequency Division Multiplexing) symbols. All beams whose directions cover the whole coverage can be generated simultaneously. However, this structure requires (almost) one-to-one mapping between TXRU (transceiver/RF chain) and antenna element and is quite complicated as the number of antenna element increases and system bandwidth increases (also heat problem exists).

Figure 5:
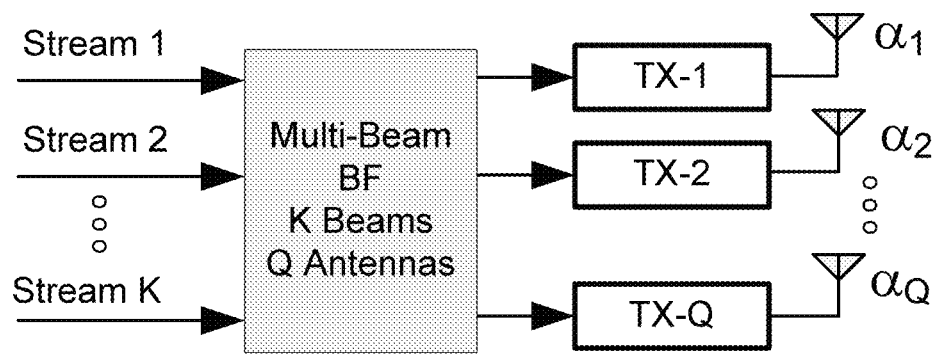
FIG. 5 illustrates three exemplary types of beamforming according to one exemplary embodiment.
Figure 5:
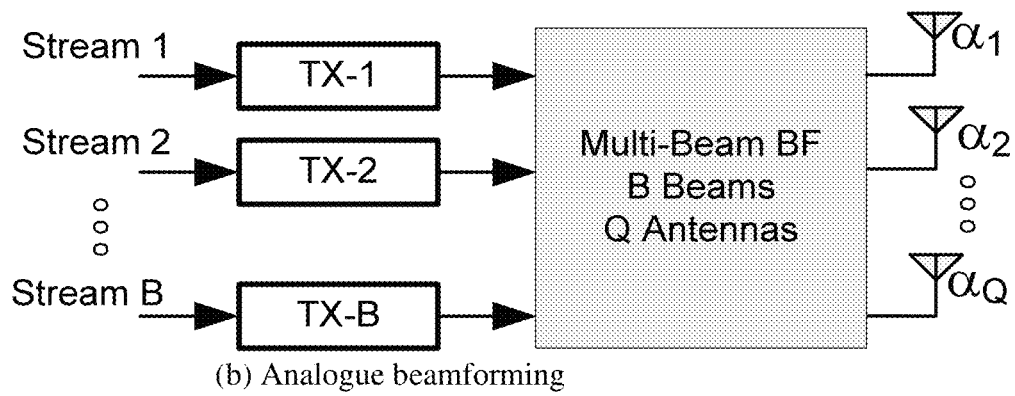
Figure 5:
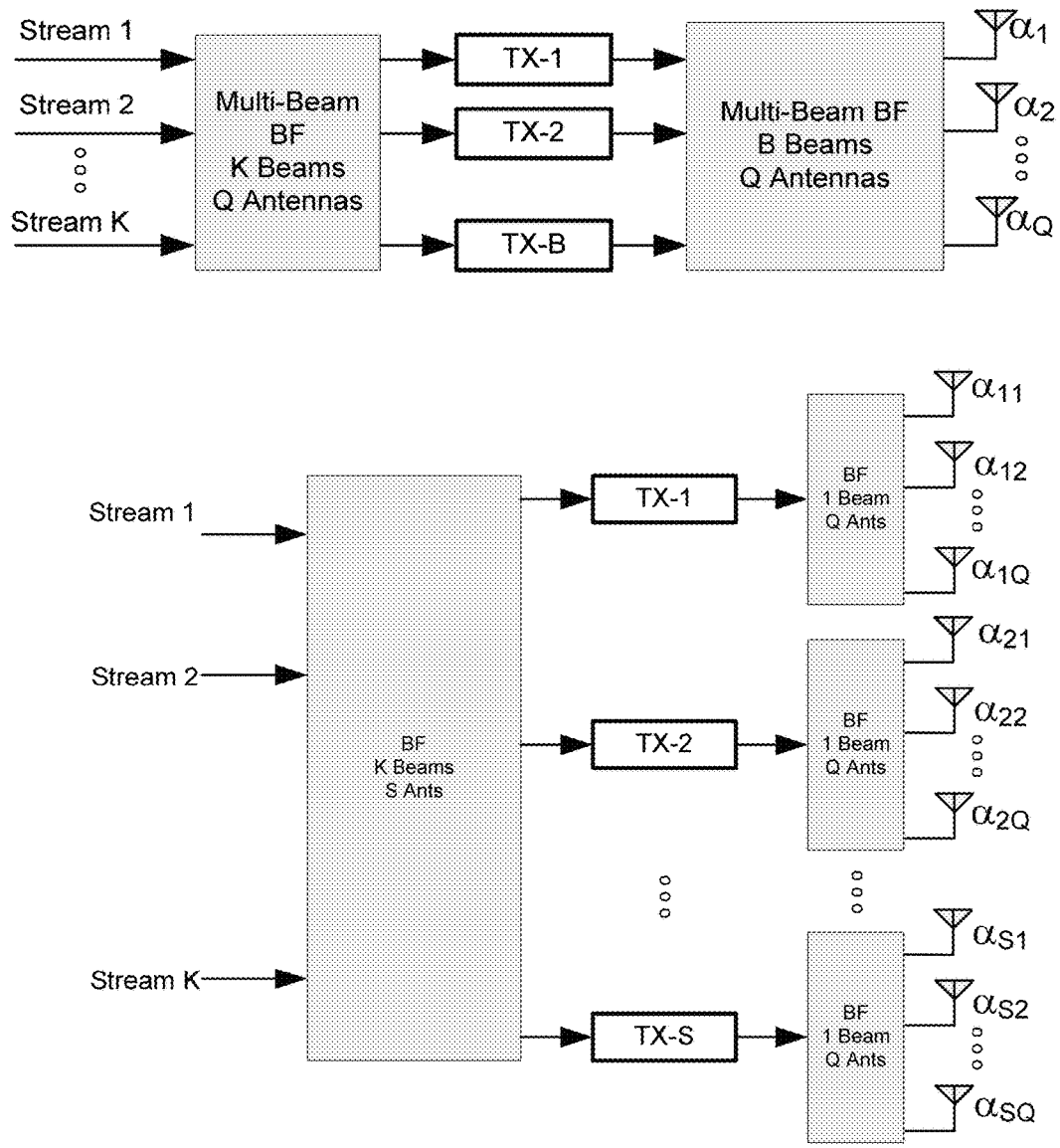

For Analog beamforming, the beam is generated on the analog domain, i.e., the weighting of each antenna element can be controlled by an amplitude/phase shifter in the RF (Radio Frequency) circuit. Since the weighing is purely controlled by the circuit, the same beam direction would apply on the whole system bandwidth. Also, if beam direction is to be changed, switching time is required. The number of beam generated simultaneous by an analog beamforming depends on the number of TXRU. Note that for a given size of array, the increase of TXRU may decrease the antenna element of each beam, such that wider beam would be generated. In short, analog beamforming could avoid the complexity and heat problem of digital beamforming, while is more restricted in operation. Hybrid beamforming can be considered as a compromise between analog and digital beamforming, where the beam can come from both analog and digital domain. Examples of the three types of beamforming are shown in FIG. 5.

In 3GPP R2-162709, an eNB may have multiple TRPs (either centralized or distributed). Each TRP can form multiple beams. The number of beams and the number of simultaneous beams in the time/frequency domain depend on the number of antenna array elements and the RF at the TRP.

Potential mobility type for NR can be listed as follows:
Intra-TRP mobility
Inter-TRP mobility
Inter-NR eNB mobility In 3GPP R2-162762, reliability of a system purely relying on beamforming and operating in higher frequencies might be challenging, since the coverage might be more sensitive to both time and space variations. As a consequence of that the SINR of that narrow link can drop much quicker than in the case of LTE.

Using antenna arrays at access nodes with the number of elements in the hundreds, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker than in the case of wide area coverage, as provided by LTE.

With the support of beam operation and TRP (Transmission/Reception Point), a cell may have multiple choices to schedule a UE. For example, there may be multiple beams from a TRP transmitting the same data to the UE, which can provide more reliability for the transmission. Alternatively, multiple beams from multiple TRPs can transmit the same data to the UE. To increase the throughput, it is also possible for a single TRP to transmit different data on different beams for the UE. Also, multiple TRPs can transmit different data on different beams to the UE.

Depending on UE capability, a UE may also generate a narrow beam when transmitting or receiving data/signal and may suffer from above restriction of base station beam, i.e., the number of UE beams can be generated simultaneously is limited. The following UE beam could correspond to beam(s) generated by a UE when transmitting or receiving signals, to distinguish from base station beam or network beam, which refers to beam(s) generated by a base station or network node when transmitting or receiving signals. If it is not specifically mentioned, the following beam can refer to a base station beam, a UE beam, or both.

One way to track the current beam(s) (either or both of base station beam and UE beam) available for communication could be to perform measurement from the UE side. A base station may transmit reference signal on all base station beams or some of the base station beams in certain time occasion(s). After measuring the reference signal, the UE may detect whether there is any beam change or update, e.g., an existing beam disappears or a new beam comes out. Also, UE may send a report with beam measurement result to the base station to inform base station the new status of beam(s). The reference signal for beam measurement may be sent periodically, aperiodically, or semi-persistently. For periodic beam reference signal, the base station may configure a proper periodicity for measurement occasion(s) when UE would perform measurement.

Within a measurement occasion, the base station may generate all base station beams to allow UE to update the status of all base station beams. (Note that a measurement occasion may be composed of several symbols, and different base station beam could be transmitted on different symbols). On the other hand, an aperiodic beam reference signal is transmitted when there is an associated triggering signal. When the UE detects the associated triggering signal (e.g., a control signal, a control channel, an uplink grant, or a downlink assignment), the UE would realize there would be beam reference signal in an associated timing occasion, e.g., the rest of the symbol(s) in the same slot or the symbol(s) in the following slot.

For aperiodic beam reference signals, as there is already information obtained from the periodic beam reference signal, the base station may choose some base station beams, e.g., those may reach the UE, instead of sending beam reference signal on all beams. Also, the base station beam(s) used to transmit the aperiodic beam reference signal may be different from the base station beam(s) used to transmit the periodic beam reference signal. For example, the base station beam(s), which are used to transmit the aperiodic beam reference signal, may be narrower than those used to transmit the periodic beam reference signal.

Another example could be the direction of base station beam(s) used to transmit the aperiodic beam reference signal may be different from the direction of base station beam(s) used to transmit the periodic beam reference signal. For example, the direction of base station beam(s) used to transmit the aperiodic beam reference signal could be slightly adjusted compared to the periodic one so that the beam quality could be improved, refined, or fine-tuned (e.g., if UE location is not on the same direction of a beam used to carry periodic beam reference signal). Semi-persistent reference signal could be something in between (e.g., first being configured, start periodic transmission if there is an associated signal, and could modify or pause the transmission if another associated signal is detected).

It is possible for UE to request the beam reference signal (e.g., an aperiodic beam reference signal) if UE detects there is a beam quality change, UE mobility, UE rotation or any other case when beam refinement or adjustment is required. The UE may send such request with a control element, a control signal, a control channel, or a preamble. Of course, as discussed above, an aperiodic beam reference signal can be sent by the base station without request from the UE, if the base station detects that a beam refinement or adjustment is required.

A UE may be served by more than one TRP, where one or multiple base station beam(s) from each TRP could be used to transmit data/signal to the UE. One or multiple base station beam(s) from all the serving TRP(s) could form a base station beam set of the UE.

It is possible that a UE may detect beam refinement/adjustment is required for some beam(s) or some TRP(s) among the beams within the base station beam set of the UE while beam refinement/adjustment is not require for other beam(s) or other TRP(s) among the beams within the base station beam set of the UE. In this situation (i.e., only beam direction of some beam(s) or beam direction of some TRP(s) are changed and beam direction of other beam(s) or beam direction of other TRP(s) are unchanged), simply requesting beam reference signal for beam adjustment/refinement is inefficient as the base station has no idea beam direction of which beam(s) or of which TRP(s) is changed/unchanged. Therefore, the base station would need to send the beam reference signal for refining/adjusting all the beams within the beam set of the UE, even if some of them does not require any adjustment. As one base station beam might needs several transmission occasions to carry the beam reference signal (with a narrower beam or several different beam directions), performing refinement or adjustment for all beams in the beam set of the UE would require more resources to carry a beam reference signal (e.g., many symbols or slots). Also, as the number of occasions associated with one triggering signal is expected to be limited, performing refinement or adjustment for all beams in the beam set of the UE may also result in more triggering of beam reference signal, which increases the control overhead as well.

From the perspective of the base station, it is also possible that the base station detects only some beam(s) or some TRP(s) among the beams within the base station beam set of the UE would require refinement or adjustment. When the base station transmits the beam reference signal on the beam(s) or the TRP(s), the UE may not be able to decide what is the correct UE beam to perform the beam measurement for beam adjustment or refinement.

A first general concept of this invention is that when a UE requests beam refinement or adjustment, the UE would indicate which beam(s) or beam(s) from which TRP(s) would require beam refinement/adjustment associated with the request. An example of requesting beam refinement or adjustment would be to request beam reference signal.

A general second concept of this invention is that when a base station triggers beam refinement or adjustment for a UE, the base station would indicate that beam refinement or adjustment is performed on which beam(s) or beam(s) from which TRP(s) associated with the trigger. An example of triggering beam refinement or adjustment for a UE would be to send an aperiodic trigger for beam reference signal to the UE.

In one embodiment, a UE could send a request to a base station to request a beam reference signal, wherein the request could include information indicating which beam(s) or which TRP(s) would require beam reference signal(s). In one embodiment, the information could indicate beam id(s) or TRP id(s). The information could be carried explicitly on a channel used to send the request. Alternatively, the information could be carried implicitly according to which resource is used to send the request. More specifically, an association between resource(s) and beam id or TRP id could be previously configured.

In one embodiment, the request could be transmitted on a control channel, on a data channel, or via a preamble. The beam reference signal could be an aperiodic beam reference signal. The UE could decide which beam(s) or which TRP(s) requires beam reference signal according to measurement on periodic beam reference signal, according to decoding failure of a channel, UE mobility, UE rotation, and/or UE location.

In one embodiment, a base station could transmit the aperiodic beam reference signal in accordance with the request from the UE. More specifically, the UE could perform measurement on the aperiodic beam reference signal with the UE beam(s) associated with the requested beam(s) or beam(s) from requested TRP(s).

In another embodiment, a base station could send a trigger to a UE to trigger aperiodic beam reference signal(s) for some beam(s) or for some TRP(s), wherein the trigger could include information of aperiodic beam reference signal(s) corresponding to which beam(s) or which TRP(s). The information could indicate beam id(s) or TRP id(s). Furthermore, the information could be carried explicitly on a channel used to trigger aperiodic reference signal(s).

In one embodiment, the trigger could be transmitted on a control channel. More specifically, the trigger could be transmitted together with a downlink assignment or together with an uplink grant. Alternatively, the trigger could be transmitted on a data channel. The base station could decide which beam(s) or which TRP(s) requires a beam reference signal according to measurement on reference signal(s)

transmitted by the UE, according to decoding failure of a channel, according to UE mobility, and/or according to UE location.

In one embodiment, the UE could perform measurement on the aperiodic beam reference signal(s) in accordance with the trigger from the base station. More specifically, the UE could perform measurement on aperiodic beam reference signal with UE beam(s) associated with the triggered beam(s) or beam(s) from triggered TRP(s).

In one embodiment, the trigger could indicate how many symbols are used to carry the aperiodic beam reference signal. Furthermore, the trigger could indicate the mapping between symbols and beam(s) or beam from which TRP(s).

Figure 6:
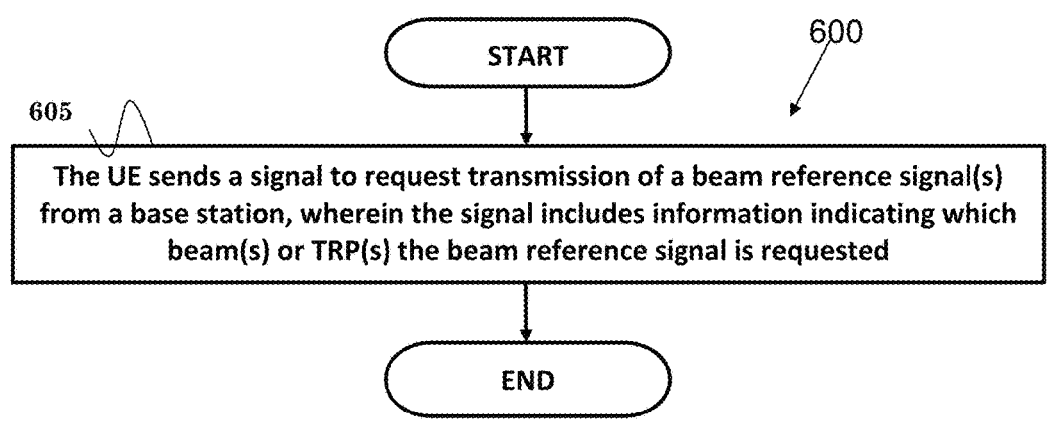
FIG. 6 is a flow chart according to one exemplary embodiment.

FIG. 6 is a flow chart 600 according to one exemplary embodiment from the perspective of a UE. In step 605, the a UE sends a signal to request transmission of a beam reference signal(s) from a base station, wherein the signal includes information indicating which beam(s) or TRP(s) the beam reference signal is requested.

Referring back to FIGS. 3 and 4, in one exemplary embodiment of a UE, the device 300 includes a program code 312 stored in the memory 310. The CPU 308 could execute program code 312 to enable the network node to send a signal to request transmission of a beam reference signal(s) from a base station, wherein the signal includes information indicating which beam(s) or TRP(s) the beam reference signal is requested. Furthermore, the CPU 308 can execute the program code 312 to perform all of the above-described actions and steps or others described herein.

Figure 7:
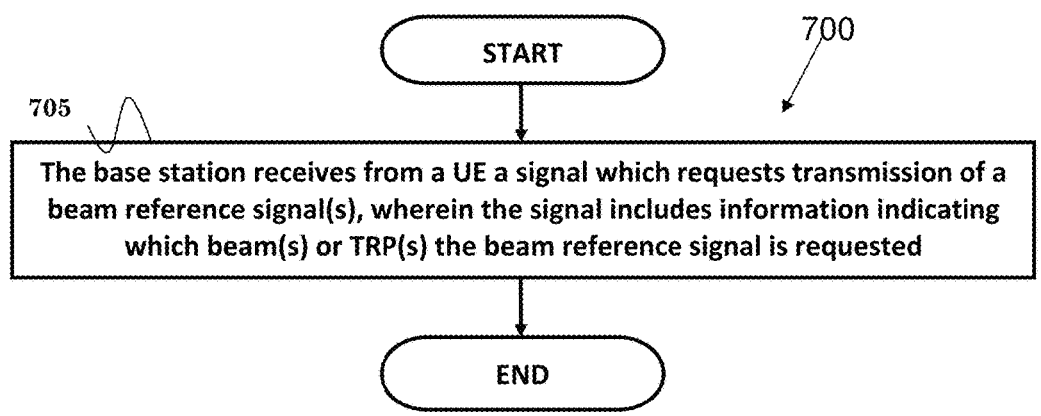
FIG. 7 is a flow chart according to one exemplary embodiment.

FIG. 7 is a flow chart 700 according to one exemplary embodiment from the perspective of a base station. In step 705, the base station receives from a UE a signal which requests transmission of a beam reference signal(s), wherein the signal includes information indicating which beam(s) or TRP(s) the beam reference signal is requested.

Referring back to FIGS. 3 and 4, in one exemplary embodiment of a base station, the device 300 includes a program code 312 stored in the memory 310. The CPU 308 could execute program code 312 to receive from a UE a signal which requests transmission of a beam reference signal(s), wherein the signal includes information indicating which beam(s) or TRP(s) the beam reference signal is requested. Furthermore, the CPU 308 can execute the program code 312 to perform all of the above-described actions and steps or others described herein.

In the context of the embodiments illustrated in FIGS. 6 and 7 and discussed above, in one embodiment, the information could indicate beam id(s) or TRP id(s). The beam refinement or adjustment for the UE could be performed for the beam(s) or TRP(s) indicated by the information. The beam reference signal(s) could be aperiodic beam reference signal(s).

In one embodiment, the signal to request a beam reference signal(s) could be a preamble. The preamble could be a dedicated preamble. In addition, the preamble could be different from a preamble used to initiate a random access procedure. Furthermore, the preamble could use a resource different from the resource of a preamble used to initiate a random access procedure. In one embodiment, the preamble can only be sent if the UE has a valid timing advance.

In one embodiment, the signal to request a beam reference signal(s) could be a control channel or a scheduling request. Furthermore, the scheduling request could be a different from a scheduling request to request uplink grant. In general, a resource configured to send the scheduling request is different from a resource configured to send scheduling request to request uplink grant. In one embodiment, the signal to request a beam reference signal(s) could be a data channel. The information could be carried on the signal.

In one embodiment, the information could be indicated based on the resource used to transmit the signal. Multiple resources are configured, and each resource could be associated with a beam/TRP/set of beams/set of TRP(s). In one embodiment, the determination of a which beam(s) or TRP(s) is indicated in the information is based on a measurement of a reference signal(s). In one embodiment, the reference signal(s) could be periodic reference signal(s). Furthermore, the determination of which beam(s) or TRP(s) is indicated in the information could be based on decoding of a downlink channel, UE mobility, UE location, and/or UE rotation.

In one embodiment, the base station could send the beam reference signal for beam(s) or TRP(s) indicated in the information. The UE could measure the beam reference signal with UE beams associated with the indicated beam(s) or with the indicated TRP.

In one embodiment, beam refinement or adjustment is required for some beam(s) or some TRP(s) among the beams within the base station beam set of the UE while beam refinement or adjustment may not require for other beam(s) or other TRP(s) among the beams within the base station beam set of the UE.

Figure 8:
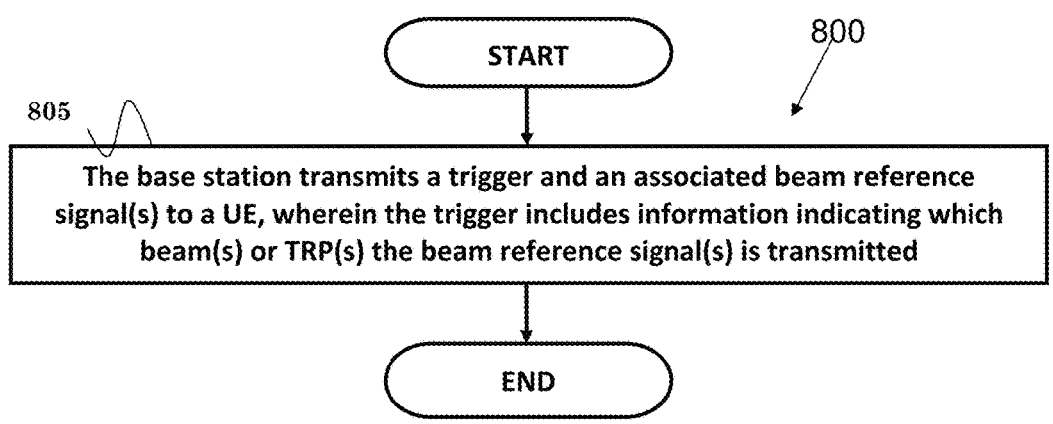
FIG. 8 is a flow chart according to one exemplary embodiment.

FIG. 8 is a flow chart 800 according to one exemplary embodiment from the perspective of a base station. In step 805, the base station transmits a trigger and an associated beam reference signal(s) to a UE, wherein the trigger includes information indicating which beam(s) or TRP(s) the beam reference signal(s) is transmitted.

Referring back to FIGS. 3 and 4, in one exemplary embodiment of a base station, the device 300 includes a program code 312 stored in the memory 310. The CPU 308 could execute program code 312 to transmit a trigger and an associated beam reference signal(s) to a UE, wherein the trigger includes information indicating which beam(s) or TRP(s) the beam reference signal(s) is transmitted. Furthermore, the CPU 308 can execute the program code 312 to perform all of the above-described actions and steps or others described herein.

Figure 9:
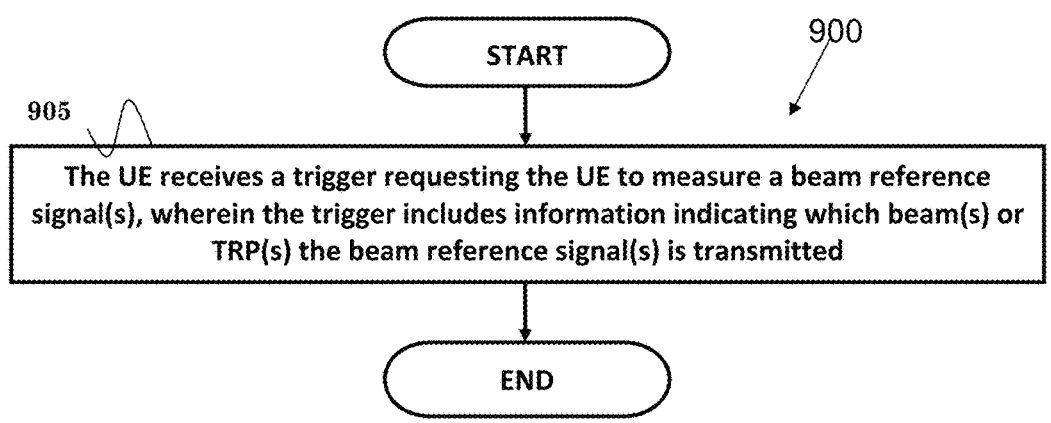
FIG. 9 is a flow chart according to one exemplary embodiment.

FIG. 9 is a flow chart 900 according to one exemplary embodiment from the perspective of a UE. In step 905, the UE receives a trigger requesting the UE to measure a beam reference signal(s), wherein the trigger includes information indicating which beam(s) or TRP(s) the beam reference signal(s) is transmitted.

Referring back to FIGS. 3 and 4, in one exemplary embodiment of a UE, the device 300 includes a program code 312 stored in the memory 310. The CPU 308 could execute program code 312 to receive a trigger requesting the UE to measure a beam reference signal(s), wherein the trigger includes information indicating which beam(s) or TRP(s) the beam reference signal(s) is transmitted. Furthermore, the CPU 308 can execute the program code 312 to perform all of the above-described actions and steps or others described herein.

In the context of the embodiments illustrated in FIGS. 8 and 9 and discussed above, in one embodiment, the UE could perform measurement on the beam reference signal(s) with UE beam(s) associated with the indicated beam(s) or the indicated TRP(s). The information could indicate beam id(s) or TRP id(s). The beam refinement or adjustment for the UE could be performed for the beam(s) or TRP(s) indicated by the information. The beam reference signal(s) could be aperiodic beam reference signal(s).

In one embodiment, the trigger could be a control channel, a downlink assignment, an uplink grant, or a data channel. The information could be carried on the trigger. Furthermore, the information could be indicated based on which beam(s) or TRP(s) is used to carry the trigger.

In one embodiment, the determination of which beam(s) or TRP(s) is indicated in the information could be based on a measurement of a reference signal(s). The reference signal(s) could be sounding reference signal(s). In one embodiment, the determination of which beam(s) or TRP(s) is indicated in the information could be based on decoding of an uplink channel, on UE mobility, on UE location, or on UE rotation. Beam refinement or adjustment could be required for some beam(s) or some TRP(s) among the beams within the base station beam set of the UE while beam refinement or adjustment may not require for other beam(s) or other TRP(s) among the beams within the base station beam set of the UE.

In one embodiment, the trigger could indicate how many symbols are used to carry the aperiodic beam reference signal. Furthermore, the trigger could indicate the mapping between symbols and beam(s) or beam from which TRP(s).

Figure 10:
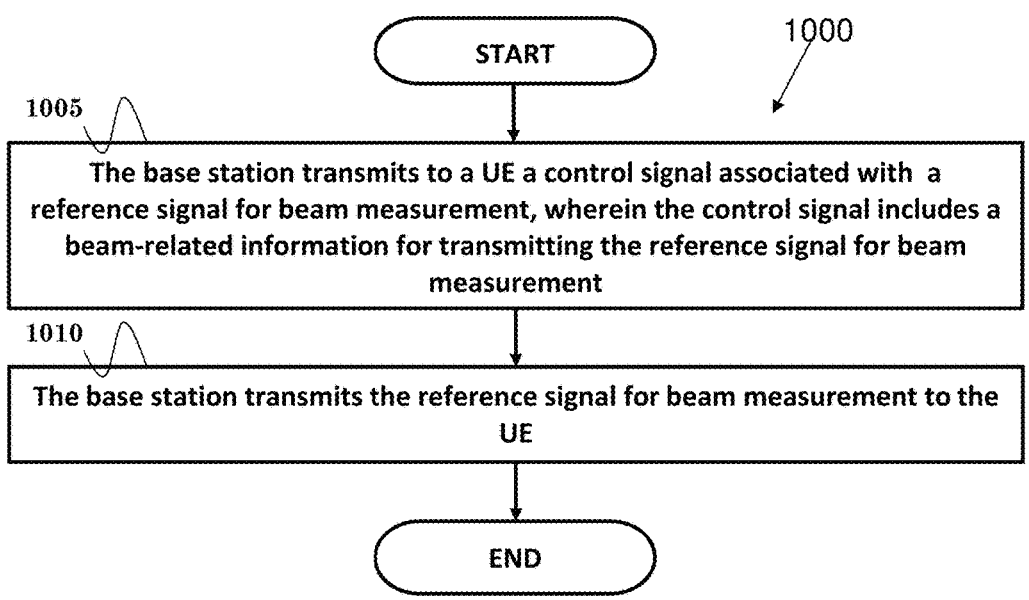
FIG. 10 is a flow chart according to one exemplary embodiment.

FIG. 10 is a flow chart 1000 according to one exemplary embodiment from the perspective of a base station. In step 1005, the base station transmits to a UE a control signal associated with a reference signal for beam measurement, wherein the control signal includes a beam-related information for transmitting the reference signal for beam measurement. In step 1010, the base station transmits the reference signal for beam measurement to the UE.

Referring back to FIGS. 3 and 4, in one exemplary embodiment of a base station, the device 300 includes a program code 312 stored in the memory 310. The CPU 308 could execute program code 312 (i) to transmit to a UE a control channel associated with a reference signal for beam measurement, wherein the control signal includes a beam-related information for transmitting the reference signal for beam measurement, and (ii) to transmit the reference signal for beam measurement to the UE. Furthermore, the CPU 308 can execute the program code 312 to perform all of the above-described actions and steps or others described herein.

Figure 11:
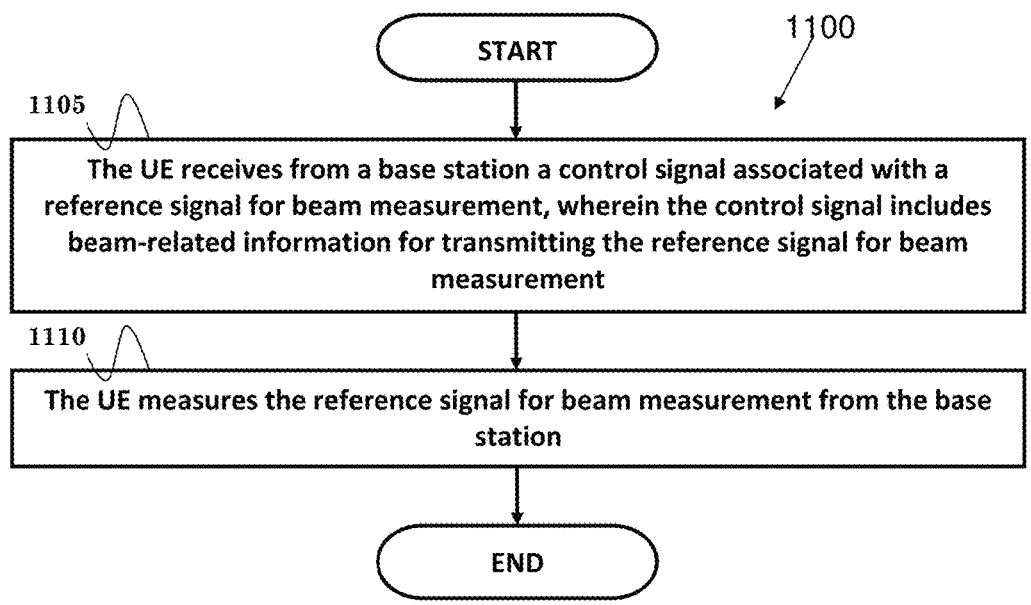
FIG. 11 is a flow chart according to one exemplary embodiment.

FIG. 11 is a flow chart 1100 according to one exemplary embodiment from the perspective of a UE. In step 1105, the UE receives from a base station a control signal associated with a reference signal for beam measurement, wherein the control signal includes beam-related information for transmitting the reference signal for beam measurement. In step 1110, the UE measures the reference signal for beam measurement from the base station.

Referring back to FIGS. 3 and 4, in one exemplary embodiment of a UE, the device 300 includes a program code 312 stored in the memory 310. The CPU 308 could execute program code 312 (i) to receive from a base station a control signal associated with a reference signal for beam measurement, wherein the control signal includes beam-related information for transmitting the reference signal for beam measurement, and (ii) to measure the reference signal for beam measurement from the base station. Furthermore, the CPU 308 can execute the program code 312 to perform all of the above-described actions and steps or others described herein.

In the context of the embodiments illustrated in FIGS. 10 and 11 and described above, in one embodiment, the beam-related information could indicate at least a beam on which the reference signal for beam measurement is transmitted. Alternatively or additionally, the beam-related information could indicate a first beam and the reference signal for beam measurement is transmitted on at least a refined beam of the first beam.

In one embodiment, the reference signal for beam measurement could be transmitted aperiodically. The control signal could be transmitted via a control channel. In one embodiment, the control signal could be transmitted via a data channel. In one embodiment, the control signal could indicate how many symbols are used to carry the reference signal for beam measurement. In one embodiment, the control signal indicates a presence of the reference signal for beam measurement. In addition, the control signal indicates resources used to carry the reference signal for beam measurement.

In one embodiment, the UE could perform measurement on the reference signal for beam measurement with UE beam(s) associated with the beam indicated by the beam-related information. In addition, beam refinement for the UE could be performed for the beam indicated by the beam-related information.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a base station, comprising:
   the base station transmits to a UE a control signal associated with a reference signal for beam measurement, wherein the control signal triggers aperiodical transmission of the reference signal for beam measurement, and wherein the control signal includes a beam-related information for transmitting the reference signal for beam measurement and indicates how many symbols are used to carry the reference signal for beam measurement; and
   the base station transmits the reference signal for beam measurement to the UE.

2. The method of claim 1, wherein the beam-related information indicates now abandoned at least a beam on which the reference signal for beam measurement is transmitted.

3. The method of claim 1, wherein the beam-related information indicates a first beam, and wherein the reference signal for beam measurement is transmitted on at least a refined beam of the first beam.

4. The method of claim 1, wherein the control signal is transmitted via a control channel.

5. A method of a User Equipment (UE), comprising:
   the UE receives from a base station a control signal associated with a reference signal for beam measurement, wherein the control signal includes beam-related information for transmitting the reference signal for beam measurement and indicates how many symbols are used to carry the reference signal for beam measurement; and
   the UE measures the reference signal for beam measurement from the base station.

6. The method of claim 5, wherein the beam-related information indicates at least a beam on which the reference signal for beam measurement is transmitted.

7. The method of claim 5, wherein the beam-related information indicates a first beam, and wherein the reference signal for beam measurement is transmitted on at least a refined beam of the first beam.

8. The method of claim 5, wherein the UE performs measurement on the reference signal for beam measurement with UE beam(s) associated with the at least a beam indicated by the beam-related information.

9. The method of claim 5, wherein beam refinement for the UE is performed for the at least a beam indicated by the beam-related information.

10. The method of claim 5, wherein the reference signal for beam measurement is transmitted aperiodically.

11. The method of claim 5, wherein the control signal is transmitted via a control channel.

12. A base station, comprising:
    a control circuit;
    a processor installed in the control circuit; and
    a memory installed in the control circuit and operatively coupled to the processor;
    wherein the processor is configured to execute a program code stored in the memory to:
       transmit to a UE a control signal associated with a reference signal for beam measurement, wherein the control signal triggers aperiodical transmission of the reference signal for beam measurement, and wherein the control signal includes a beam-related information for transmitting the reference signal for beam measurement and indicates how many symbols are used to carry the reference signal for beam measurement; and transmit the reference signal for beam measurement to the UE.

13. The base station of claim 12, wherein the beam-related information indicates at least a beam on which the reference signal for beam measurement is transmitted.

14. The base station of claim 12, wherein the beam-related information indicates a first beam, and wherein the reference signal for beam measurement is transmitted on at least a refined beam of the first beam.

15. The base station of claim 12, wherein the control signal is transmitted via a control channel.

* * * * *

UNITED STATES PATENT AND TRADEMARK OFFICE
CERTIFICATE OF CORRECTION

| | |
|---|---|
| PATENT NO. | : 10,148,402 B2 |
| APPLICATION NO. | : 15/863267 |
| DATED | : December 4, 2018 |
| INVENTOR(S) | : Ko-Chiang Lin et al. |

It is certified that error appears in the above-identified patent and that said Letters Patent is hereby corrected as shown below:

In the Claims

Under Column 14, Line 15, please delete "now abandoned".

Signed and Sealed this
Seventeenth Day of October, 2023

*Katherine Kelly Vidal*

Katherine Kelly Vidal
*Director of the United States Patent and Trademark Office*